United States Patent Office 3,089,768
Patented May 14, 1963

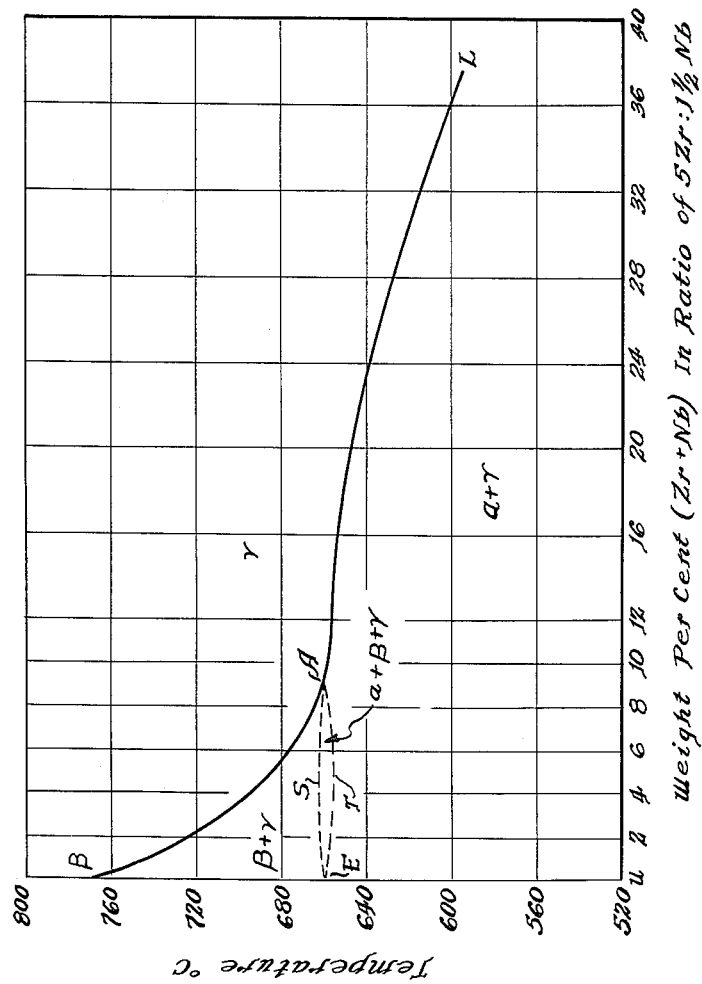

3,089,768
DIMENSIONALLY STABLE, CORROSION
RESISTANT NUCLEAR FUEL
John Howard Kittel, Naperville, Ill., assignor to the United States of America as represented by the United States Atomic Energy Commission
Filed Mar. 1, 1961, Ser. No. 92,721
3 Claims. (Cl. 75—122.7)

The invention relates to a novel dimensionally stabilized, corrosion resistant fissionable fuel for nuclear reactors and to a method for making the same.

One of the troublesome problems in nuclear reactor operation arises from the tendency of the uranium or other metallic fuel rods, or fuel elements, to grow lengthwise under the conditions of heat and irradiation in the reactor. As a result of this, fuel rods sometimes force the ends of their protective cladding so far apart that rupturing occurs, thereby releasing the dangerously radioactive fission products into the aqueous moderator or coolant, and permitting the latter to come into direct contact with the metallic fuel and cause it to corrode. In addition to such direct contact due to rupturing, direct contact may also result from small leaks in the cladding for whatever reason, as for example, when a small imperfection in the cladding results in a "pinhole" perforation. In reactors of the boiling water type, even extremely small perforations in the cladding permit steam to penetrate and corrode the actinide metal inside.

It has heretofore been known that alloying actinide fuel elements such as uranium or plutonium with zirconium and niobium improves its dimenisonal stability under reactor conditions; in particular, alloying with a zirconium-niobium additive having constant weight proportions of 5 Zr to 1½ Nb. This additive has been added to uranium to make a class of ternary alloys, the most commonly used, and the most preferable, being one of 5 w/o Zr, 1½ w/o Nb and the balance uranium. Methods are known for treating this class of alloys to improve either their dimensional stability or corrosion resistance, but not both at the same time; in most, if not in all cases, whatever enhances dimensional stability lowers resistance to corrosion and whatever helps corrosion resistance has an adverse effect upon dimensional stability.

It is accordingly an object of the invention to provide more dimensionally stable and corrosion resistant ternary alloys of an actinide metal, zirconium, and niobium, than is now known.

It is a more particular object to provide a more dimensionally stable and corrosion resistant class of alloys of uranium and a zirconium-niobium additive having constant proportions by weight of 5 Zr to 1½ Nb, than is now known.

It is a further object to provide a method of treating the above-mentioned class of alloys to impart greater dimensional stability together with resistance to corrosion, than is now known.

All the foregoing objects are attained by my discovery that the dimensional stability and corrosion resistance of the above-mentioned alloys may be improved simultaneously by a cold working treatment followed by a plural-stage heat treatment involving certain critical conditions which will be later described in connection with a phase diagram which contains a recently discovered alpha-plus-beta-plus-gamma phase. I have discovered that after passing through this phase alloys take on unusual properties of simultaneously improved dimensional stability and corrosion resistance under certain circumstances.

The single FIGURE in the drawing is the phase diagram just mentioned showing the phases of alloys of uranium with the zirconium-niobium additive above mentioned having the constant proportions by weight of 5 Zr to 1½ Nb. The weight percentages of this additive in ternary alloys with uranium are plotted as abscissae against temperature in degrees centigrade as ordinates, the phases being shown by areas of the diagram in the usual way.

It will be noted that two phases are much larger than the others, the gamma phase at the top of the diagram and the alpha-plus-gamma phase at the bottom. The beta-plus-gamma phase occupies a roughly right triangular space along the left side, and immediately beneath it is an elongated eye-shaped area, enclosed by the lines ESA and ETA, which has been, as above explained, recently determined to be a distinct alpha-plus-beta-plus-gamma phase.

It has previously been established that if the ternary alloys of the kind mentioned are suddenly quenched, as, for example, by water, when in the gamma phase, they will remain in that phase and have superior corrosion resistance but inferior dimensional stability under reactor conditions; whereas, if the alloys are put into the alpha-plus-gamma phase and gradually cooled so as to keep them in that phase, their dimensional stability will be superior but their corrosion resistance inferior to that of alloys suddenly quenched in the gamma phase.

It was reasoned that if the alloys were treated so as to crystallize in the intermediate alpha-plus-beta-plus-gamma phase, a combination of the above-mentioned superiorities might be secured, but this was not found to give the results sought for. Further experimentation was then undertaken, a part of the results of which are set forth in Table I below.

In preparing this table, specimens named in the extreme left column of my preferred alloy of 5 w/o Zr, 1½ w/o Nb, and the balance U, were all taken from the same ingot. All specimens were 1.000 inch long and 0.137 inch square, the latter being within the dimensional range of most fuel rods. Some specimens were "hot-rolled" at about 850° C., and others "cold-rolled" at about 25° C., as indicated in the next to left-hand column; those which were cold-rolled received a 12% reduction in thickness at the cold-rolling temperature. Following the rolling, the specimens were subjected to the heat treatments listed in the next column to the right, and irradiated unclad in a nuclear reactor of the thermal boiling water type to the atom percent (a/o) of burnup of the fuel indicated. These unclad specimens were in contact with the water while in the reactor. The results for the various specimens with the various combined rolling and heat treatments are listed in the succeeding columns to the right.

TABLE I

*Effect of Irradiation on Flat Rolled Specimens Isothermally Transformed at 665° C.*[a]

| Specimen No. | Final Rolling Temp., °C. | Heat Treatment | Burnup, a/o | Length Change, Percent | Growth[b] Rate, $G_i$ | Width Change, Percent | Thickness Change, Percent | Weight Change, mg. | Remarks |
|---|---|---|---|---|---|---|---|---|---|
| BH-7-4 | [c] 25 | 665° C. for 2 hr., A.C.[d] | 0.102 | 41.7 | 340 | 29.3 | −36.8 | −0.9 | Slightly Roughened. |
| BH-8-4 | 25 | 665° C. for 24 hr., A.C. | 0.097 | 29.5 | 270 | 16.2 | −25.2 | 0.0 | |
| BH-9-4 | 25 | 665° C. for 168 hr., A.C. | 0.068 | 11.3 | 160 | 9.4 | −13.5 | 0.8 | |
| BH-7-1 | 25 | 800° C. for 15 min., 665° C. for 2 hr., A.C. | 0.102 | 3.7 | 36 | 2.3 | −4.2 | −1.2 | |
| BH-8-1 | 25 | 800° C. for 15 min., 665° C. for 24 hr., A.C. | 0.097 | 2.0 | 20 | 2.2 | −2.6 | 0.3 | |
| BH-9-1 | 25 | 800° C. for 15 min., 665° C. for 168 hr., A.C. | 0.068 | 1.7 | 25 | 2.8 | −1.7 | −0.3 | |
| BH-10-4 | 850 | 665° C. for 2 hr., A.C. | 0.087 | 11.3 | 120 | 3.2 | −10.4 | −0.6 | |
| BH-11-4 | 850 | 665° C. for 24 hr., A.C. | 0.069 | 7.4 | 100 | 4.2 | −9.1 | 0.2 | |
| BH-12-4 | 850 | 665° C. for 168 hr., A.C. | 0.051 | 3.9 | 75 | 2.7 | −7.8 | −0.3 | |
| BH-10-1 | 850 | 800° C. for 15 min., 665° C. for 2 hr., A.C. | 0.087 | 5.3 | 59 | 1.4 | 2.3 | −0.3 | |
| BH-11-1 | 850 | 800° C. for 15 min., 665° C. for 24 hr., A.C. | 0.069 | 3.2 | 46 | 1.7 | −1.1 | 1.1 | |
| BH-12-1 | 850 | 800° C. for 15 min., 665° C. for 168 hr., A.C. | 0.051 | 1.8 | 35 | 1.1 | −1.7 | 0.3 | |
| BH-7-5 | 25 | 665° C. for 2 hr., A.C.; 800° C. for 15 min., W.Q.[e] | 0.102 | 8 | 76 | (f) | (f) | −0.1 | Warped. |
| BH-8-5 | 25 | 665° C. for 2 hr., A.C.; 800° C. for 15 min., W.Q. | 0.097 | 11 | 110 | (f) | (f) | 0.3 | Do. |
| BH-9-5 | 25 | 665° C. for 168 hr., A.C.; 800° C. for 15 min., W.Q. | 0.068 | 5.6 | 80 | 18 | −6.9 | −29.7 | |
| BH-7-2 | 25 | 800° C. for 15 min., 665° C. for 2 hr, A.C.; 800° C. for 15 min., W.Q. | 0.102 | 5 | 48 | (f) | (f) | −0.7 | |
| BH-8-2 | 25 | 800° C. for 15 min., 665° C. for 24 hr., A.C.; 800° C. for 15 min., W.Q. | 0.097 | 1.1 | 10 | 13 | −0.3 | −0.3 | Slightly Warped. |
| BH-9-2 | 25 | 800° C. for 15 min., 665° C. for 168 hr., A. C.; 800° C. for 15 min., W.Q. | 0.068 | 1 | 15 | (f) | (f) | 0.2 | Warped. |
| BH-10-5 | 850 | 665° C. for 2 hr., A.C.; 800° C. for 15 min., W.Q. | 0.087 | 8 | 89 | (f) | (f) | 0.6 | Do. |
| BH-11-5 | 850 | 665° C. for 24 hr., A.C.; 800° C. for 15 min., W.Q. | 0.069 | 10 | 140 | (f) | (f) | −1.3 | Do. |
| BH-12-5 | 850 | 665° C. for 168 hr., A.C; 800° C. for 15 min., W.Q. | 0.051 | 6 | 110 | (f) | (f) | −0.6 | Do. |
| BH-10-2 | 850 | 800° C. for 15 min., 665° C. for 2 hr., A.C.; 800° C. for 15 min., W.Q. | 0.087 | 9.5 | 100 | (f) | (f) | 1.0 | Do. |
| BH-11-2 | 850 | 800° C. for 15 min., 665° C. for 24 hr., A.C.; 800° C. for 15 min., W.Q. | 0.069 | 2 | 29 | (f) | (f) | −0.1 | Do. |
| BH-12-2 | 850 | 800° C. for 15 min., 665° C. for 168 hr., A.C.; 800° C. for 15 min., W.Q. | 0.051 | 2 | 39 | (f) | (f) | −1.1 | Do. |

[a] All specimens were rolled from ingot L-215.
[b] $G_i$=microin/in. per fission/$10^6$ total atoms.
[c] All specimens rolled at 25° C. were given a 12 % reduction in thickness at that temperature.
[d] A.C.=Air cooled.
[e] W.Q.=Quenched in water at room temperature.
[f] Specimen was too distorted for measurement.

A comparison of the results shown in Table I with the phase diagram of the figure is illuminating. The specimens listed in the top twelve lines of the table were not put into the gamma phase by heating to 800° C. at the end and were given no quenching treatment and so, as already explained, were inferior in corrosion resistance. Those in the bottom twelve lines were all given a fifteen minute heating to 800° C. at the end followed by a water quench, thereby imparting to them the superior corrosion resistance already mentioned.

However, among these latter the effects on growth rate and the other factors related to dimensional stability vary widely. Specimen BH-8-2 was one of only two of the latter twelve that did not become too distorted for a thickness measurement, and was found not to be "warped." At the same time this specimen had the lowest growth rate of the group, 10, which was also lower than the growth rate of any of the specimens in the entire table.

It will be noted that specimen BH-8-1 was subjected to the same rolling and heat treatments as BH-8-2, except that the 15 minute heating to 800° C. at the end followed by the water quench was omitted. This specimen had the lowest growth rate of any of the unquenched specimens in the top twelve lines, 20, yet this is double that of specimen BH-8-2, which suggests that the quenching from 800° C. is critical in this respect, as well as in respect to corrosion resistance.

However, specimen BH-11-2, was subjected to exactly the same treatment as specimen BH-8-2 except that the preliminary rolling was carried out under hot conditions at 850° C., rather than at 25° C. Its growth rate of 29, while comparatively low, is again almost three times as great as that of specimen BH-8-2, which, of itself, suggests that the cold rolling may be the decisive factor.

Taken together the results found with specimens BH-8-1 and BH-11-2 might even be looked upon as inconsistent or at least as pointing in different directions, thereby making the results with specimen BH-8-2 all the more surprising since they do not show an outcome midway when the treatments of the other two are combined, but something superior to both of them.

One theoretical explanation that has been offered for the superiority of specimen BH-8-2 over specimen BH-8-1 with respect to improved dimensional stability is that, when the former was finally transformed and quenched in the gamma phase, it had a higher degree of randomization than the latter which was allowed to remain in the alpha-plus-beta-plus-gamma phase, due to the sudden character of the transformation at 800° C. which is far above the minimum transformation temperature of 680° C., as shown by the phase diagram. Yet there is no doubt that the transformation into the alpha-plus-beta-plus-gamma phase was a necessary condition precedent to the final transformation into the gamma phase, whatever the correct theoretical reason may be. In any event, I do not wish to be bound by any particular theory, and my invention is offered on the basis of my empirical findings, as established by actual experiments.

As to the superiority over the hot-rolled specimen BH–11–2, it is believed that the cold rolling produces a smaller grain size that carries over through the other steps of the treatment to affect the final outcome. This, again, is merely a theoretical explanation which I do not wish to be bound by.

Even more striking than anything so far mentioned is a comparison of the results with specimen BH–8–2 and those of specimen BH–8–5. These two were treated identically except that in the case of the latter specimen the preliminary heating to 800° C. for 15 minutes was omitted, with the result that its growth rate was elevenfold greater. It appears surprising that this comparatively short heating should produce an effect which could carry over through the 24 hour period of heating at 665° C. in which the specimen was undoubtedly completely transformed into the alpha-plus-beta-plus-gamma phase, yet the fact is undeniable, and this is further confirmed by comparing the far lower growth rates of specimens BH–7–1, BH–8–1, and BH–9–1 with those of BH–7–4, BH–8–4, and BH–9–4. This carry-over effect is something which could not be predicted merely from the phase diagram, and is possibly to be explained by the fact that the preliminary heating to 800° C. creates a greater number of crystal nuclei so that the alpha-plus-beta-plus-gamma phase, which is thereafter created by the 24 hour heating, is in a greater state of subdivision than when this preliminary heating step is omitted. However, I again do not wish to be bound by this theoretical explanation and my invention is offered, as above stated, on the basis of my empirical findings, established by actual experiments.

Due to the metallurgical similarity of uranium and the other actinide metals, there is reason to believe that my findings would apply to all members of the actinide series.

Accordingly, my method of treating a specimen of actinide metal such as uranium alloyed with the additive of five parts by weight zirconium to one and one-half parts by weight of niobium can be carried out by giving it initially a reduction in thickness by cold-rolling in the manner of the treatment of specimen BH–8–2. The 12 percent thickness reduction is not critical, but it is sufficient to produce the smaller grain size thought to be neded, and no advantage is to be gained by reducing the thickness any further. Following this, the alloy is heated to 800° C. for a short period, such as 15 minutes, and then heat treated for a prolonged period such as 24 hours at a temperature to bring it into the eye-shaped alpha-plus-beta-plus-gamma phase shown in the figure; in the case of specimen BH–8–2 which had 6½ weight percent of the additive it can be seen that the temperature used, 665° C., was about half-way between the lower limit of this phase at about 663° and the upper limit of about 668° C. Since phase transformations take place most satisfactorily in the center of a phase area, rather than at its outer edges, a temperature of 665°–666° C. is preferred for a uranium alloy, such as BH–8–2, having 6½ w/o of the additive. For alloys having smaller amounts of the additive, the temperature range for transforming it into the alpha-plus-beta-plus-gamma phase is slightly lower due to the fact that the eye-shaped phase area of the figure is not quite horizontal but inclines lower toward the left. For alloys having more of the additive than BH–8–2, the transformation temperature range is slightly higher for the same reason.

Following the 24 hour, or some such prolonged transformation of the specimen into the alpha-plus-beta-plus-gamma phase, it is air-cooled after the manner of the treatment of specimen BH–8–2, and then heated to a temperature sufficiently high and for a sufficient time to transform it into the gamma stage quickly, and then quenched with water at room temperature. It will be noted from the figure that a specimen such as BH–8–2 with 6½ w/o of the additive can be transformed into this phase at a temperature as low as about 680° C., although at smaller percentages of the additive the minimum transformation temperature is much greater due to the steep slope from left to right of the gamma phase's lower boundary line, shown on the figure as line BL.

While, as can be seen, the temperature of 800° C. for fifteen minutes given to specimen BH–8–2 is not exactly critical, it is essential that the transformation to the gamma phase be rapid by heating to a temperature substantially above the minimum transformation temperature for a limited time. The same is true for the preliminary heating for 15 minutes.

In the case of specimens having smaller amounts of the additive than BH–8–2, the preferred transformation temperature to the gamma phase is above 800° C. due to the steeply sloping minimum transformation temperature line BL bounding the gamma phase area already mentioned. For example, at 2 weight percent of the additive, the minimum transformation temperature is about 720° C., or forty degrees higher than the minimum transformation temperature for BH–8–2. Accordingly, the preferred temperature for transforming a specimen of the alloy with this weight percent of the additive would be about 840° C. for 15 minutes.

It will be understood that this invention is not to be limited to the details given herein, but that it may be modified within the scope of the appended claims.

What is claimed is:

1. A method of improving the corrosion resistance and dimensional stability of an alloy consisting essentially of 5 weight percent zirconium, 1½ weight percent niobium and the balance uranium, comprising sequentially cold-rolling it at about 25° C. to reduce its thickness by about 12 percent, maintaining it at about 800° C. for about 15 minutes, maintaining it at about 650° C. for about 24 hours, air-cooling it to about 25° C., maintaining it at about 800° C. for about 15 minutes and quenching it in water.

2. A method of improving the corrosion resistance and dimensional stability of an alloy consisting essentially of uranium and from a trace to about 9 weight percent of an additive consisting of zirconium and niobium in the proportions by weight of five zirconium to one and one-half niobium, comprising sequentially cold-rolling the alloy to reduce its thickness by about 12 percent, maintaining it for about 15 minutes at a temperature substantially above the line BL in the graph of the accompanying drawing, maintaining it at a temperature within the area enclosed by the lines ESA and ETA in said graph for a time sufficient to transform the alloy to the alpha-plus-beta-plus-gamma phase, air-cooling it, maintaining it at a temperature substantially above the line BL in said graph for a sufficient time to transform the alloy to the gamma phase, and quenching the alloy in water, the weight percentage of said additive in said alloy being indicated by the abscissae of said graph.

3. The product of the process of claim 2.

References Cited in the file of this patent
UNITED STATES PATENTS
2,947,621 Foote _____ Aug. 2, 1960

OTHER REFERENCES
AEC Document BMI 915, September 1957, page 26.
AEC Document BMI 1278, November 1956.
AEC Document BMI 1098, June 1957.